UNITED STATES PATENT OFFICE.

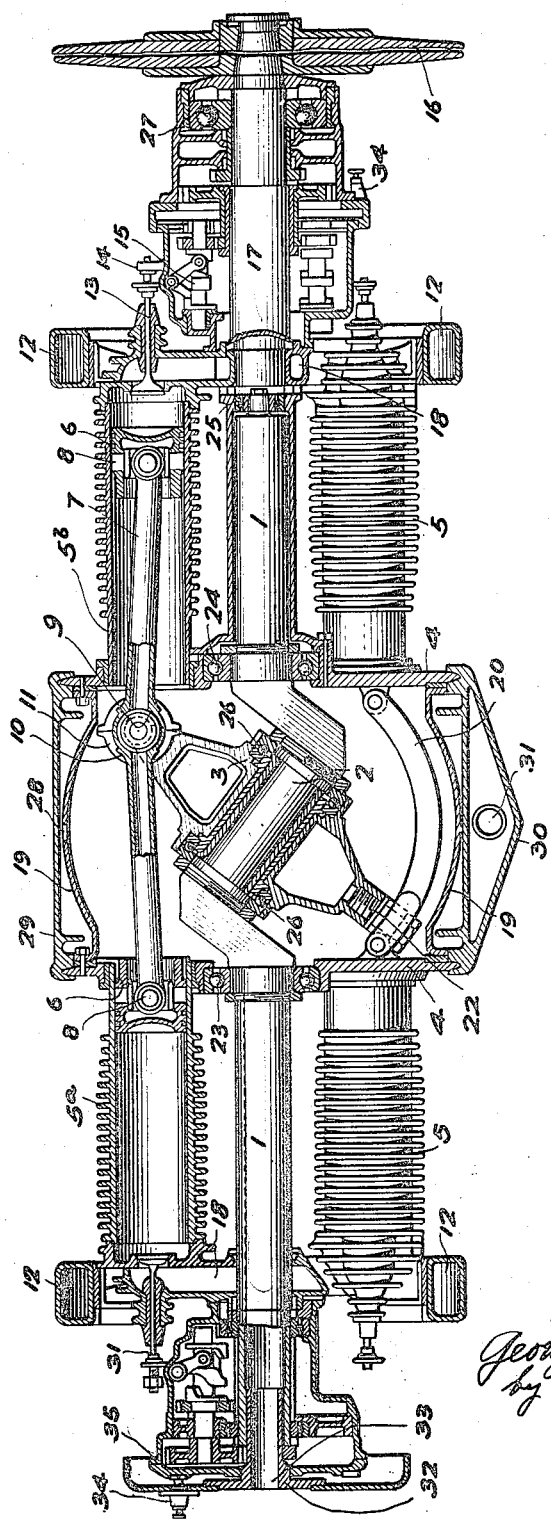

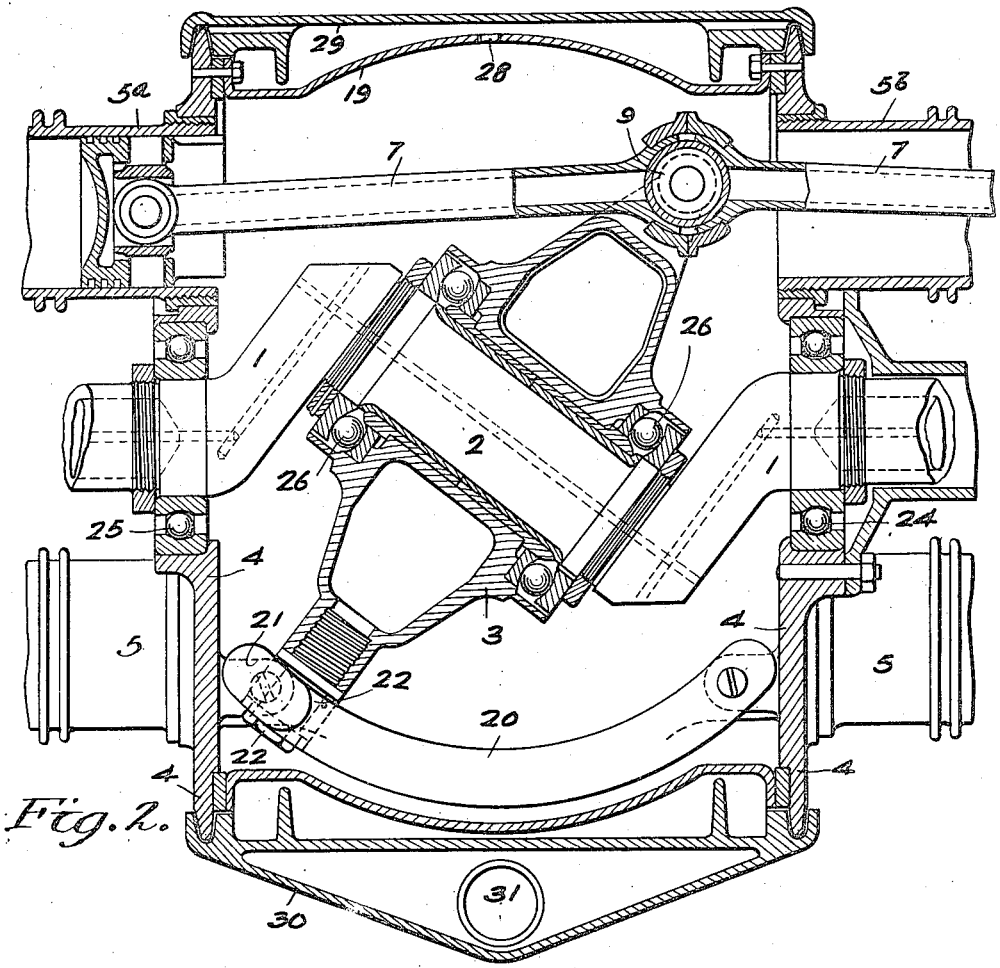
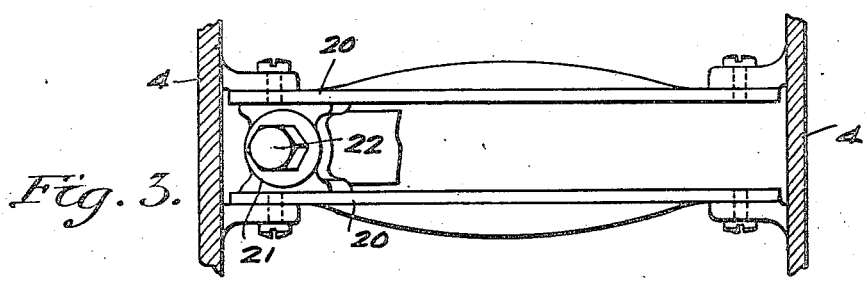

GEORGE N. HICKEY, OF DETROIT, MICHIGAN, ASSIGNOR TO UNITED STATES AIRPLANE AND ENGINE COMPANY, A CORPORATION OF DELAWARE.

ENGINE.

1,252,436.

Specification of Letters Patent.

Patented Jan. 8, 1918.

Application filed September 17, 1917. Serial No. 191,811.

*To all whom it may concern:*

Be it known that I, GEORGE N. HICKEY, a citizen of the United States, residing at Detroit, in the county of Wayne and the State of Michigan, have invented new and novel Improvements in Engines, of which the following is a specification.

My invention relates to improvements in engines of the kind wherein a plurality of cylinders are placed in a longitudinal position around a shaft and rotate around an axis running through the shaft in conjunction with an angle plate rotatably mounted in an angular position upon said shaft which is driven by the pistons.

One of the objects of this invention is to provide means whereby the rotation of the angle plate will cause the cylinders to rotate synchronously with the angle plate by means of a new and novel universal joint or driving member connecting the angle plate with the cylinders.

Another object is to provide means whereby the angle plate may be given a sharper angular position in relation to the axis of the shaft than has been possible in former engines of this character, thus increasing the power developed and throwing less strain upon the angle plate bearings.

Still another object is to provide means whereby the friction between the pistons and the cylinders due to centrifugal force when the cylinders are rotating will be counteracted or greatly lessened.

Still other objects will appear and be disclosed in the specifications and drawings herewith.

Figure 1 is a longitudinal view of engine partly in section.

Fig. 2 is an enlarged sectional view of the angle plate and oil case.

Fig. 3 is an enlarged sectional view of the universal driving member operating between the angle plate and the cylinders.

Similar numerals refer to like parts throughout the several views.

Referring now to Fig. 1, the numeral 1, is a stationary shaft with an angular bearing 2, around which the angle plate 3, is rotatably mounted. This angle plate is made in two parts so that it can be readily put into place around the bearing 2, and then bolted firmly together. 4 4, are cylinder carriers upon which one end of each cylinder is rigidly fixed. 5 5, shows the outside of the cylinders and 5ª 5ᵇ, shows the cylinders in section. The pistons 6 6, are connected to the connecting rods 7 7, by universal joints 8 8, which allow angular movement in all directions. Upon the angle plate 3, are fixed round ball connecting rod holders 9, which serve the same purpose as crank pins in the ordinary reciprocating engine and carry the lower end bearings 10, of the connecting rods. These lower end bearings are concave to fit over the ball holders and are held in place by the caps 11 11, which are bolted together in any well known manner. The center of these ball connecting rod holders when at its nearest point to the axis of shaft 1, are still outward circumferentially with relation to the axis of the cylinders so that when pressure is applied to the face of the pistons within the cylinders such as that due to compression or an explosion the angularity of the connecting rods has the effect of forcing the pistons inwardly toward the shaft and thus counteracts the centrifugal force which when the engine is running and the cylinders rotating around an axis would otherwise exert considerable friction between the pistons and the outer wall of the cylinders. The exhaust manifolds are shown at 12 12, and are stationary being held in place by a frame (not shown) in any well known manner. 13 13, are the usual puppet valves. 14 14, rocker arms. 15, the cams which operate the rocker arms. 16, is an air propeller (blades cut away) mounted upon the stub shaft 17, which is rigidly connected to the cylinders and rotates with them. On the other end of the engine shown in Fig. 1, the shaft 1, is stationary being rigidly fixed to the engine frame and the cylinders and cylinder housing rotate around the shaft 1, otherwise the operation of the cylinders on each end is alike. 18 18, are inlets for the explosive medium which is admitted through the end 33, of the stationary shaft 1, to the cylinders at one end and through the rotating stub shaft 17, to the cylinders at the other end. 19 19, is the oil (or crank) case cover and is rigidly fastened to the cylinder housings 4 4. This oil case cover is provided with openings around its periphery 28, so that the centrifugal force throws the surplus oil out of the oil case and it is then caught by the stationary oil case cover 29, from whence it drains by gravity into the oil sump 30, which is also stationary and from there it may be pumped into a reservoir through the opening 31. Situated within and between the cylinder housings 4 4, and rigidly fixed therein are two circular shaped tracks 20 20, shown in detail in Fig. 3. Between these tracks the shoe 21, is pivotally mounted upon the bearing 22, fixed to the angle plate 3, at a point between two of the ball connecting rod holders 9. The ball bearings 23, 24, and 25, are for the purpose of damping vibration of the crank shaft. 26 26, are thrust bearings to take up the end thrust of angle plate and 27, is a ball bearing to carry the strain of the air propeller 16. 34, is a spring held plunger connected to an electric circuit and 35, is a distributer ring which is insulated and timed to suit the firing order desired.

The operation of engine is as follows: Assuming that the pistons are in the position shown in cylinders $5^a$ and $5^b$ and that the piston in $5^b$ has just completed its compression stroke having previously been supplied with an explosive mixture through the induction ports 18, and that cylinder $5^a$ has just completed its power stroke and is at the beginning of its exhaust stroke. The explosive charge would therefore be ignited by an electric charge through the plunger 34, in any well known manner, at or slightly before the highest point of compression (commonly called the dead center) is reached, about in the position shown in Fig. 1. This explosion will then drive the angle plate 3, around, because of its slanting position upon the shaft and as it turns the universal joint or driving member shown in Fig. 3 will cause the cylinder housing, cylinders, oil case and all of the engine parts, excepting the stationary shaft 1, the exhaust manifold 12, and the oil case cover 29, and sump 30, to rotate synchronously with the angle plate and as they rotate the expansive stroke is taking place in cylinder $5^b$, while the exhaust stroke is occurring in cylinder $5^a$. Then on its next rotation when the cylinders $5^a$, and $5^b$ again reach the position in which they are shown in Fig. 1, cylinder $5^a$, will be at the end of its induction stroke and cylinder $5^b$, at the end of its exhaust stroke, but on the succeeding rotation cylinder $5^a$, will be again at the beginning of its exhaust stroke and cylinder $5^b$ will just have completed its compression stroke ready to begin its power stroke and so on. The cylinders on one end of engine explode when at the top and at the other end when at the bottom, but alternating with each other. An odd number of cylinders are used at each end and the valves, ignition and other functions are timed so that their operation is on the 4 cycle plan. Thus every second cylinder explodes as it arrives at or near its point of maximum compression and as the number of cylinders at each end of the engine is odd thus, 3, 5, or 7 cylinders the firing occurs as every alternate cylinder arrives at its position where the piston is at the end of the compression stroke and thereby each cylinder has one firing stroke when two complete revolutions of the cylinders have been made. No two cylinders fire at once but with 7 cylinders at each end of the engine there are 7 power strokes to each revolution of the cylinders, the power impulses occurring first at one end of the engine and then at the other.

I claim:

1. In a rotary engine, the combination of a cylinder carrier rotatably mounted upon a stationary shaft, an angular bearing upon said shaft upon which is rotatably mounted an angle plate carrying at or near its periphery a plurality of connecting rods, each of said connecting rods being operated by pistons within a cylinder, said cylinder fastened at one end to said cylinder carrier, a universal joint driving member between said angle plate and said cylinder carrier to cause them to rotate synchronously when driven by the pistons.

2. In an engine having a plurality of cylinders rotatably mounted in a horizontal position around a shaft, a cylinder carrier upon which one end of each cylinder is mounted, an angle plate rotatably mounted in an angular position upon said shaft and driven by pistons within said cylinders, a stub shaft bearing upon or near the periphery of said angle plate having a shoe rotatably mounted thereon, a crescent shaped track fixed to the cylinder carrier against which said shoe contacts to rotate said carrier and cylinders synchronously with the rotation of the angle plate.

3. In an engine of the character described, the combination of a stationary shaft having an angular bearing theron, an angle plate rotatably mounted upon said angular bearing, said angle plate carrying a plurality of spherical connecting rod holders, each of said connecting rod holders having mounted thereon two connecting rods each of said connecting rods being connected to a piston in opposed cylinders, each cylinder mounted at one end upon a cylinder carrier which is rotatably mounted upon said shaft, means for rotating said angle plate and means for causing the cylinders to rotate synchronously therewith.

4. In an engine, the combination of a shaft, an angle plate angularly mounted to rotate around the axis of said shaft, means for rotating said angle plate, a cylinder frame adapted to rotate around the axis of said shaft, cylinders fixed to said cylinder frame longitudinally mounted with relation to the shaft and adapted to rotate around the axis of said shaft, a universal joint adapted to drive the cylinders synchronously with the rotation of the angle plate, an oil case rigidly mounted upon the cylinder frame to rotate therewith, a stationary oil case cover surrounding said oil case, openings in the periphery of said rotatable oil case whereby surplus oil will be thrown out into the oil case cover by centrifugal action when the cylinders are rotating and means for removing the surplus oil from said oil case.

GEO. N. HICKEY.